(12) United States Patent
Ngai

(10) Patent No.: US 6,782,589 B2
(45) Date of Patent: Aug. 31, 2004

(54) METHOD FOR FORMING LAMINATE NONWOVEN FABRIC

(75) Inventor: Mou-Chung Ngai, Boxmeer (NL)

(73) Assignee: Polymer Group, Inc., North Charleston, SC (US)

(*) Notice: Subject to any disclaimer, the term of this patent is extended or adjusted under 35 U.S.C. 154(b) by 221 days.

(21) Appl. No.: 09/997,682

(22) Filed: Nov. 29, 2001

(65) Prior Publication Data

US 2002/0078538 A1 Jun. 27, 2002

Related U.S. Application Data

(60) Provisional application No. 60/253,759, filed on Nov. 29, 2000.

(51) Int. Cl.[7] .............................................. D04H 1/46
(52) U.S. Cl. ........................................ 28/104; 28/167
(58) Field of Search .......................... 28/104, 105, 106, 28/167, 163; 442/384, 387, 408; 156/62.8, 148, 182; 8/148

(56) References Cited

U.S. PATENT DOCUMENTS

| | | | |
|---|---|---|---|
| 3,047,444 A | * | 7/1962 | Harwood ...................... 28/104 |
| 4,069,563 A | * | 1/1978 | Contractor et al. ........... 28/105 |
| 4,718,152 A | * | 1/1988 | Suzuki et al. ................. 28/104 |
| 4,808,467 A | * | 2/1989 | Suskind et al. ............. 442/384 |
| 5,009,747 A | | 4/1991 | Viazmensky et al. |
| 5,153,056 A | * | 10/1992 | Groshens .................... 442/150 |
| 5,275,700 A | | 1/1994 | Trokhan |
| 5,396,689 A | * | 3/1995 | Vuillaume .................... 28/103 |
| 5,525,397 A | | 6/1996 | Shizuno et al. |
| 5,609,947 A | * | 3/1997 | Kamei et al. ................ 428/212 |
| 5,935,880 A | | 8/1999 | Wang et al. |
| 6,253,429 B1 | * | 7/2001 | Zolin .......................... 28/104 |
| 6,314,627 B1 | * | 11/2001 | Ngai ........................... 28/104 |
| 6,487,762 B1 | * | 12/2002 | Fleissner .................... 28/104 |
| 6,550,115 B1 | * | 4/2003 | Skoog et al. ................. 28/104 |
| 6,568,049 B1 | * | 5/2003 | Putnam ....................... 28/104 |
| 6,571,441 B1 | * | 6/2003 | Kobayashi et al. ........... 28/104 |

* cited by examiner

*Primary Examiner*—Amy B. Vanatta
(74) *Attorney, Agent, or Firm*—Wood, Phillips, Katz, Clark & Mortimer

(57) ABSTRACT

A method for creating a nonwoven laminate fabric has steps of depositing a first nonwovne layer on a moving support, depositing a second nonwoven layer over the first layer, and conveying the layers under a manifold. The manifold has a plurality of jet clusters separated from one another by a distance. Water is directed form the jet clusters onto the underlying layers to thereby create a laminated fabric. Because the jet clusters are separated from one another, the laminate fabric is "pattern entangled". Bundling occurs along substantially linear lines, with much lighter bundling in regions between the linear bundling regions. The result is a fabric with regions of relative strong entanglement and other regions of much lighter entanglement. When three layers are laminated, with top and bottom layers of thin veneer and a center layer of pulp the method of the invention has been discovered to result in a laminate fabric with particular utility as a flushable wipe product.

20 Claims, 3 Drawing Sheets

MACHINE DIRECTION

METHOD FOR FORMING LAMINATE NONWOVEN FABRIC

FIELD OF THE INVENTION

The present invention relates to nonwoven fabrics, and to methods for fabric fabricating nonwoven fabrics. In particular, the present invention relates to a method for forming laminate nonwoven that is flushable and biodegradable.

BACKGROUND OF THE INVENTION

Wipes and other industrial and sanitary nonwoven fabrics are known. These fabrics may be used for wiping liquids or moist solids. Often, it is desirable for one side of the fabric to remain substantially dry when the other is exposed to the liquid or moist solid. To accomplish this, a substantially impermeable fabric layer may be used, or multiple layers of permeable layer may be bound together with adhesive. These wipes may comprise normal tissue, wet laid tissue, and spunlace fabrics. These fabrics may be used in various combinations in a laminate with an adhesive binder.

These types of wipes, however, are disadvantageous in that they are not flushable. The fabric qualities that render them substantially impermeable to a liquid penetration also render them as disadvantageously non-degradable in the sewer system. For commercial success, flushable wipes generally must have four properties: 1) be stable during use with liquids/moist solids, 2) must lose integrity in the sewer system under normal shear forces, 3) be biodegradable, and 4) have a soft surface feel.

U.S. Pat. No. 5,935,880 to Wang, et al., discloses a wipe that satisfies the previously mentioned four properties, however, a binder is incorporated on at least one side of the wipe and the wipe is exposed to full face hydraulic needling. The application of a binder, which in the Wang patent is a composition of three different ingredients, adds to cost complexity and production time, while utilizing a full face hydraulic entanglement process consumes more energy due to the increased number of water jets needed to uniformly entangle the full width of the fabric. These two factors make for a wipe that is neither cost effective nor energy efficient.

There is thus a heretofore unresolved need in industry for a method for making a nonwoven fabric that is flushable and biodegradable, cost effective, and energy efficient.

SUMMARY OF THE INVENTION

In a first embodiment of the method for making a laminate nonwoven fabric of the invention, the method comprises the steps of: providing a first nonwoven layer on a moving support; providing a second nonwoven layer overlying the first layer on the moving support; and pattern hydroentangling the first and second layers to one another to form a laminate nonwoven fabric. The step of pattern hydroentangling the first and second layers comprises providing a first manifold with a plurality of jet cluster therein, each of the jet cluster having a plurality of individual jet orifices therein, with the jet orifices each separated from one another by at least a first distance. The jet clusters are separated from one another by a second distance that is greater than the first distance. Preferably, the second distance is at least twice the first distance, and more preferably at least 10 times the first distance. The first embodiment of the method of the invention further comprises the step of conveying the second layer overlying the first layer on the moving support under the manifold in a machine direction while directing streams of water through each of the individual jet orifices onto the underlying nonwoven layers, with the layers thereby entangled with one another.

Because the jet orifices are organized into separated and distinct jet clusters, the resulting entanglement pattern is not "uniform" across the cross direction of the laminate, but is instead along substantially linear lines in the machine direction. The resulting laminate is characterized by strongly bundled areas, with weakly unbundled areas therebetween. These weak unbundled areas are engineered to allow the laminate to lose its integrity under the shear forces in the sewage systems.

A second embodiment of the method for making a laminate nonwoven fabric of the invention comprises the steps of: providing a first nonwoven layer on a moving support; providing a second nonwoven layer overlying the first layer on the moving support; and pattern hydroentangling the first and second layers to one another to form a laminate nonwoven fabric. The step of pattern hydroentangling the first and second layers comprises providing a first manifold with a plurality of jet orifices therein separated form one another by a distance, and conveying the second layer overlying the first layer on the moving support under the manifold in a machine direction while moving the manifold in a direction coincident with the machine direction. Streams of water form each of the individual jet orifices will be directed onto the first and second layers to thereby laminate them to one another, with the areas of lamination not linear in the machine direction due to movement of the manifold. Preferably, the manifold is oscillated in a substantially cross direction to create a "wavy" entanglement pattern in the laminate.

In an additional embodiment of the method of the invention, at least a second manifold is provided also having a plurality of water jet orifices therein. As the overlaid first and second nonwoven layers are conveyed beneath the moving first manifold and the second manifold, the layers are hydroentangled with a substantially linear pattern by the stationary second manifold and a non-linear pattern by the moving first manifold. In a further embodiment of the method of the invention, the second manifold is also moved in a direction coincident with the machine direction to thereby enhance the non-linear entanglement pattern. Preferably, the first and second manifolds are oscillated in substantially opposite direction to create a zig-zagged entanglement pattern.

It will be appreciated that altering the number and movement of the manifolds used to hydroentangle the nonwoven layers within the scope of the invention can result in an almost limitless variation of entanglement patterns.

Preferably, the first manifold has a plurality of jet clusters therein, with each of the jet clusters having a plurality of individual jet orifices; each of the jet orifices within each of the jet clusters separated from one another by a first distance, and with each of the jet clusters separated from one another by a second distance that is greater than the first distanced. Preferably, the second distance that separated jet cluster is at least twice the first distance that separates individual jet orifices within each cluster. More preferably, the second distance is at least 10 times the first distance. Also, the second manifold preferably has its individual jet orifices arranged into jet clusters.

In still an additional embodiment of the method of the invention, three layers and laminated to one another, with the first and third preferably comprising thin veneer layers, and the second and center layer comprising a tissue or pulp layer.

It has been discovered that through the method of the invention, a laminate nonwoven fabric may be made that solves the above discussed heretofore unresolved problems in the art. In particular, the novel method of pattern hydroentangling using manifolds with spaced clusters of jets results in a laminate fabric that holds together sufficiently for use, both that is otherwise not so tightly bound so as to be degradable under the normal sheer pressures present in the sewer system.

The above brief description sets forth rather broadly the more important features of the present disclosure so that the detailed description that follows may be better understood, and so the present contributions to the art may be better appreciated. There are, of course, additional features of the disclosure that will be described hereinafter which will form the subject matter of the claims appended hereto. In this respect, before explaining the several embodiments of the disclosure in detail, it is to be understood that the disclosure is not limited in its application to the details of the construction and the arrangements set forth in the following description or illustrated in the drawings. The present invention is capable of other embodiment and of being practiced and carried out in various ways, as will be appreciated by those skilled in the art. Also, it is to be understood that the phraseology and terminology employed herein are for description and not limitation.

DETAILED DESCRIPTION

Figure 1:
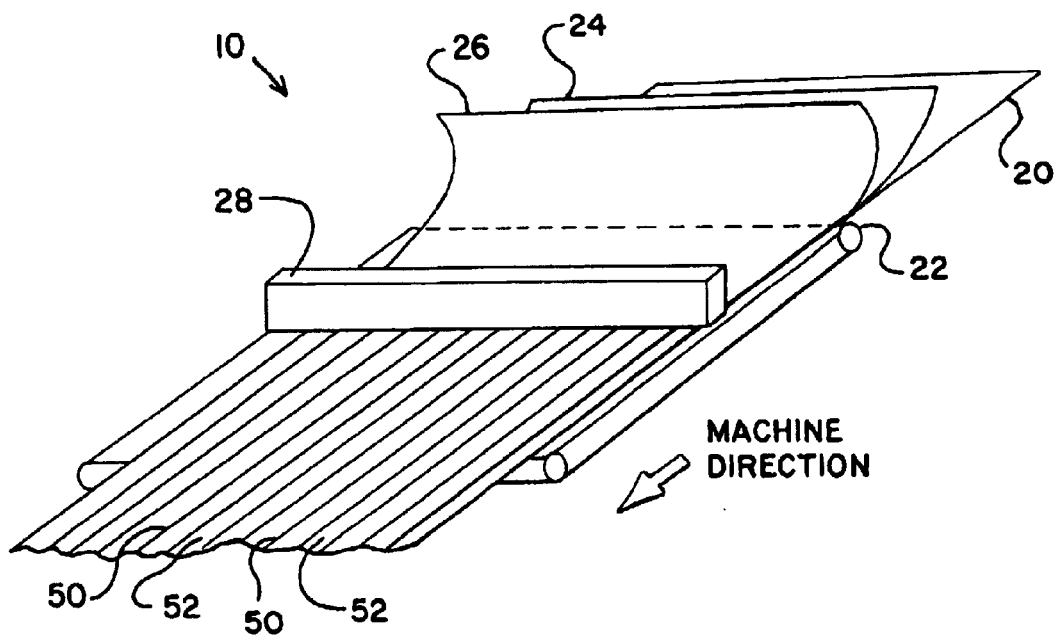
FIG. 1 is a perspective of an apparatus practicing an embodiment of the method of the invention.

Turning now to the drawings, FIG. 1 illustrates an apparatus 10 practicing an embodiment of the method of the invention. First hydroentangled nonwoven layer 20 is provided on moving support 22. Moving support 22 is illustrated generally as a rotating conveyor in FIG. 1. Moving support 22 is preferably porous to allow water to drain through it, and as will be appreciated by those knowledgeable in the art may take many different forms than conveyor belt 22 as illustrated. By way of example only and not limitation, a rotating porous sleeve having a three dimensional raised surface may be used.

Figure 2:
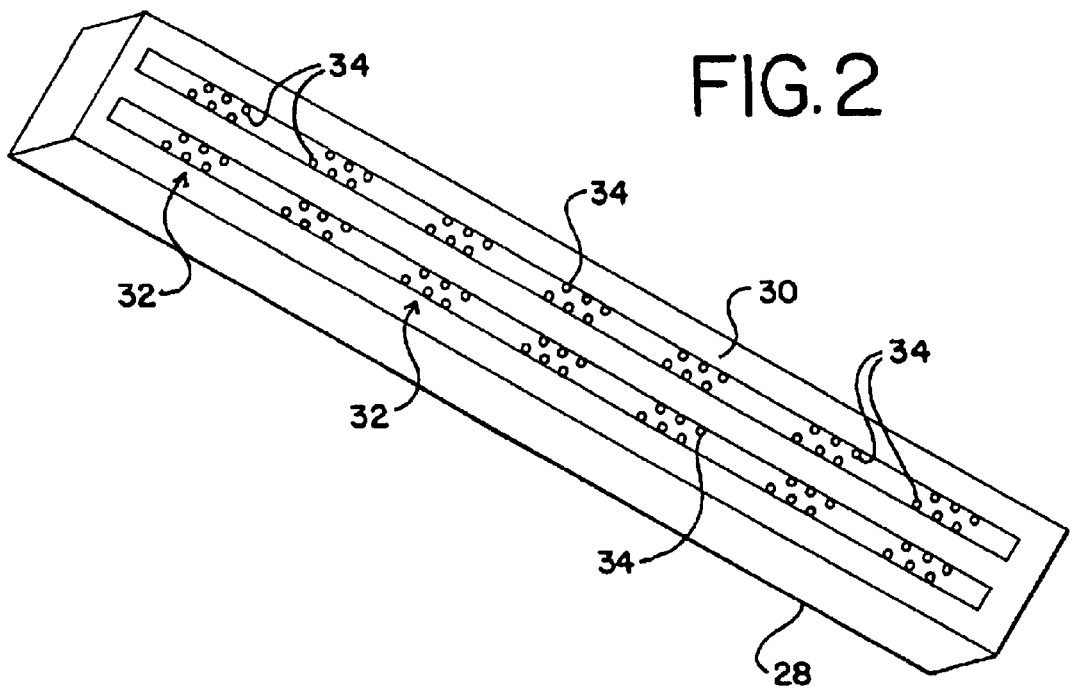
FIG. 2 is a bottom perspective view of the manifold of FIG. 1.

A second nonwoven layer 24 is overlaid on top of first layer 20, and a third nonwoven layer 26 overlaid on top of second layer 24. Support 22 with the three layers thereon is then conveyed under manifold 28. Manifold 28 is fed with water via a water line (not illustrated), which may be pressurized as desired. A perspective view looking upwards at the bottom side 30 of manifold 28 is shown in FIG. 2. Manifold 28 has a plurality of jet clusters 32, with each individual jet cluster 32 having a plurality of individual jet orifices 34, as is best shown in the expanded plan view of FIG. 3 of manifold bottom side 30. Water is directed from each individual orifice 34 onto the layers 20, 24, and 26 as they are passed below to entangle fibers from each of the individual layers to fibers from others of the layers and thereby form a laminate nonwoven fabric.

Figure 3:
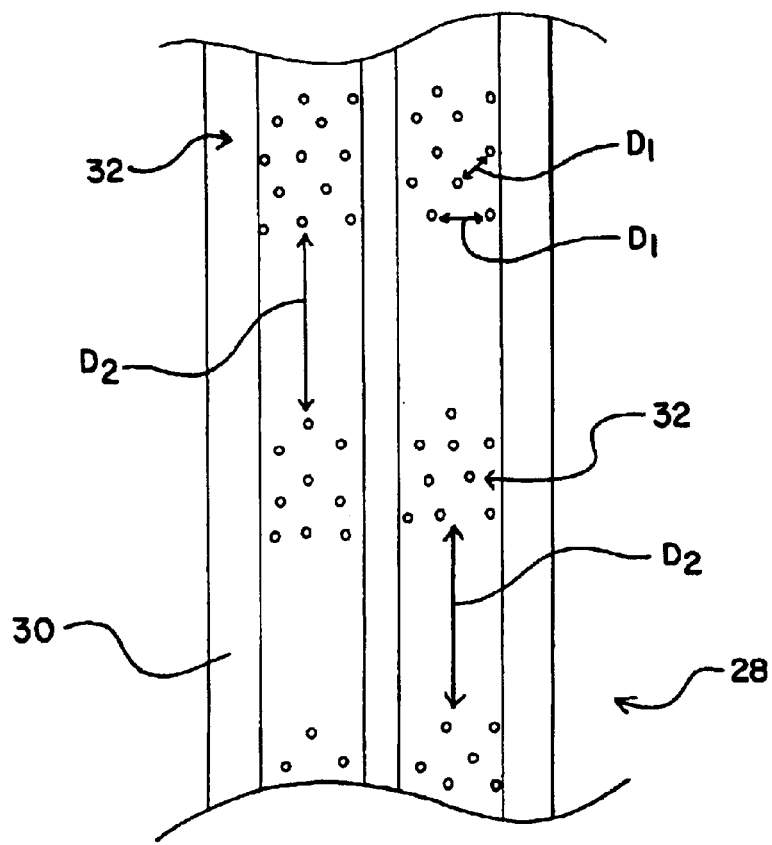
FIG. 3 is a bottom plan view of the manifold of FIGS. 1 and 2.

As shown in FIG. 3, each individual jet orifice 34 within a jet cluster is separated from one another by a distance of $D_1$. It will be appreciated that $D_1$ need not be a constant; individual jet orifices 34 may be separated from one another by differing distances $D_1$. It will further be appreciated that FIG. 3 is not drawn to scale. Each jet cluster 32 is separated from one another by a second distance $D_2$. Again, it will be appreciated that $D_2$ need not be constant; jet clusters 32 may be separated from one another by differing distances $D_2$. $D_2$ is greater than $D_1$. That is, the lowest value for $D_2$ is greater than the largest value for $D_1$. Preferably, $D_2$ is at least twice $D_1$. More preferably, $D_2$ is at least 10 times $D_1$.

When nonwoven layers 20, 24, and 26 are conveyed on support 22 under manifold 28 as illustrated in FIG. 1 in the direction of the arrow labeled "Machine Direction", the discrete grouping of jet clusters 32 impinge streams of water onto the layers 20, 24, and 26 to thereby entangle them with one another to form a laminate nonwovne fabric. Because jet clusters 32 are separated from one another and grouped, the resulting laminate fabric is said to have a "pattern entanglement". That is, entanglement occurs substantially along lines 50 as illustrated where the laminate is strongly bundled, and with regions 52 between lines 50 remaining much more lightly bundled or even substantially unentangled. It will be appreciated that lines 50 are shown as single lines for illustration purposes only; the area of entanglement along these lines 50 may actually be spread in an area that corresponds generally to the area of jet cluster 32.

It has been discovered that the method of the invention is of particular utility in making novel flushable wipes. For this utility, unentangled regions 52 between lines of entanglement 50 result in a laminate fabric that has a wet strength sufficient to remain intact during use, but that is low enough so that the fabric will lose its integrity and be disentangled under normal shear stresses present in the sewer system so as to be flushable. When using the method of the invention to produce such a flushable wipe, it is preferred to use a lightly entangled veneer layer as first layer 20 and third layer 26, with pulp or tissue layer 24 in between. Such construction advantageously provides for soft surface feel, with a substantially fluid impermeable center layer.

In one preferred embodiment of the method of the invention for making a flushable wipe, first and third layers comprise hydroentangled nonwoven layers of viscose rayon fibers. Preferred fiber lengths are from 25–40 mm. A blend of a small amount of synthetic fiber may also be used. Preferred weight ranges for the first and third nonwoven layers are between 10 and 35 $gm/m^2$. More preferred weight ranges are between 18 and 24 $gm/m^2$. For this preferred embodiment of the method for producing a flushable wipe, the second layer comprises tissue of pulp, with a weight basis of between about 20 and 80 $gm/^2$. A more preferred weight range is between 40 and 50 $gm/m^2$.

In this first preferred embodiment of the method of the invention for making a flushable wipe, the preferred first and third veneer nonwoven layers are preferably lightly entangled with low spunlace energy entanglement. As used herein, "low spunlace energy" entanglement is intended to refer to a process of hydroentanglement that will result in a fabric having a low enough tear strength so that it will lose its integrity under normal shear stresses present in the sewer system. This energy will of course depend on the basis weight of the fabric, as well as the geometry of the support underlying the fabric. The structure of the veneer fabrics can of course be varied by fiber selection and selection of underlying support surface. Fine to close support structure is preferred for low weight fabric.

For purposes of example, a veneer fabric was prepared using low spunlace energy on a micro porous forming sleeve. The fabric was prepared by hydroentangling viscose rayon fibers having a basis weight of 20.5 gm/$^2$ under four jet stations, each station delivering water of 10 bars, and with a line speed of 20 m/min. This veneer was then used as the first and third layers to form a laminate using the method of the invention. Two different wipes were made, one with a center pulp layer of 27.5 gm/m$^2$, and the second with a center pulp layer of 55 gm/m$^2$. These two wipes therefore had a total wipe fabric basis weight for the first wipe of 68.5 gm/$^2$ (20.5+55+20.5), and for the second of 96 gm/m$^2$ (20.5+55+20.5). Each of these two wipes were pattern laminated to form a laminate wipe using two manifolds generally as illustrated in FIGS. 1–3 with a line speed of 10 m/min using water under 5 bar pressure.

Figure 4:
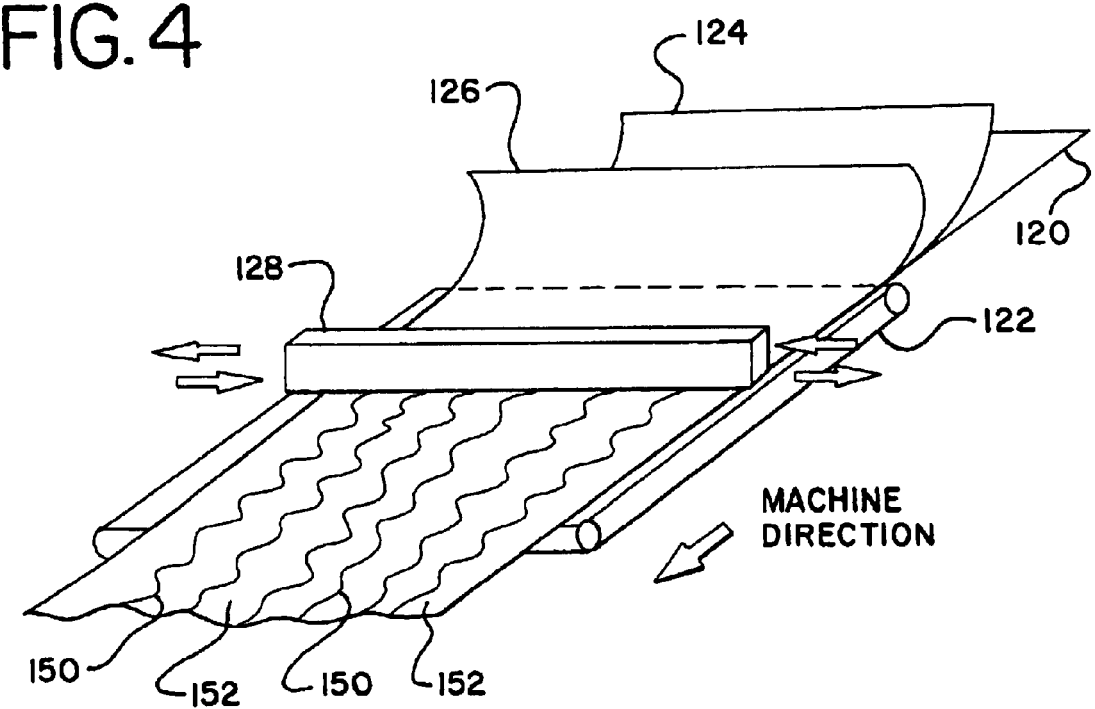
FIG. 4 is a perspective of an apparatus practicing an additional embodiment of the method of the invention.

FIG. 4 illustrates an additional embodiment of the invention being practiced. First nonwoven layer 120 is deposited on moving support 122, with second nonwoven layer 124 deposited on top of first layer 120, and third nonwoven layer 126 deposited on top of layer 124. The layers 120, 124, and 126 are then conveyed on support 122 under manifold 128. Manifold 128 is substantially identical to manifold 28 of FIGS. 1–3, with a plurality of jet clusters each containing a plurality of individual jet orifices therein. As layers 120, 124, and 126 are conveyed under manifold 128, streams of water are directed from its jet orifices onto the underlying layers 120, 124, 126 to thereby pattern entangle the layers into laminate fabric.

As layers 120, 124, and 126 are conveyed under manifold 128 in machine direction as indicated by the arrow, manifold 128 is moved in a direction coincident with the machine direction. Preferably, as illustrated in FIG. 4 by the arrows, manifold 128 is oscillated back and forth in cross direction. The oscillation of manifold 128 in combination with the jet orifice clusters within the manifold results in a "wavy" entanglement pattern on the resultant laminate fabric. That is, regions of bundling occur generally along wavy lines 150, with more lightly or even unentangled regions 152 therebetween. Incorporating lightly entangled or unentangled regions along with a "pattern entanglement" into a wipe, is an effective method of producing a flushable, biodegradable wipe and further, it is energy efficient. It will again be appreciated that the area of entanglement may be larger that the thin wavy lines 150 as illustrated, and will generally correspond to the area of jet clusters 32.

As will be appreciated, manifold 128 may be moved in a variety of directions within the scope of the invention. Different patterns of movement may be desirable to produce different entanglement patterns having differing utilities. By way of example only, and not limitation, manifold 128 may be moved in a first cross direction at a first speed, and then moved back in a substantially opposite cross direction at a different speed. Also, the present invention comprises movement in directions other than substantial cross direction. By way of example, manifold 128 could be rotated about a central axis near the center of the manifold 128.

Figure 5:
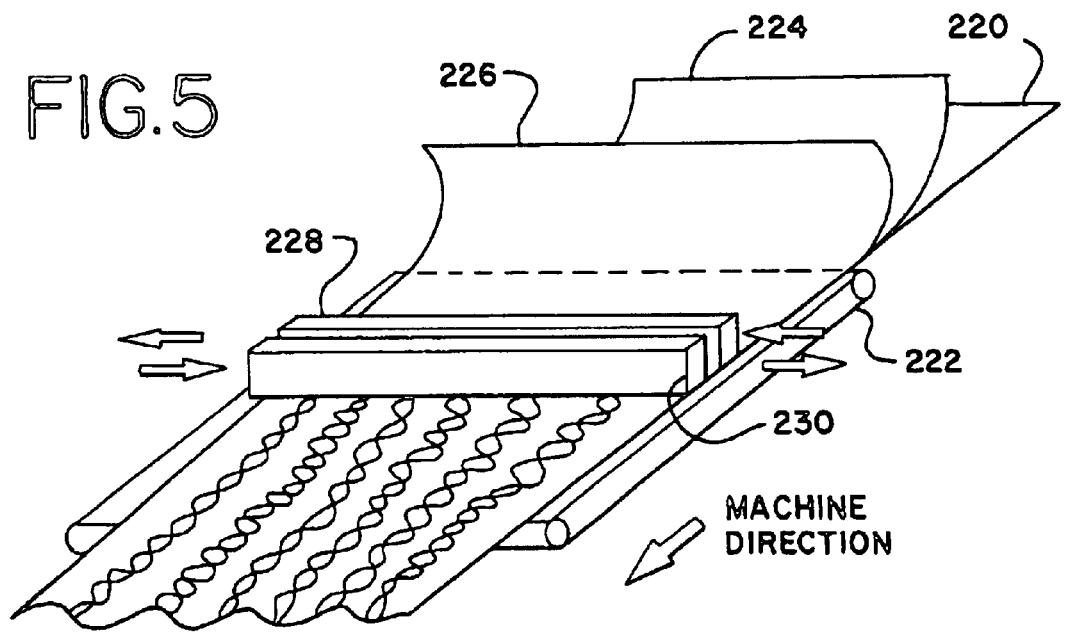
FIG. 5 is a perspective of an apparatus practicing still another embodiment of the method of the invention.

FIG. 5 illustrates apparatus 210 practicing yet another embodiment of the method of fabricating a nonwoven of the present invention. This embodiment of the method of the invention is similar in most respects to that discussed above in reference to FIG. 4. Three nonwoven layers 220, 224, and 226 are deposited on a moving support 226, and conveyed under manifold 228, which is substantially similar to manifold 28 discussed herein above with reference to FIGS. 1–3. In particular, manifold 228 comprises a plurality of jet clusters separated by a distance. Manifold 228 is oscillated in a cross direction to generate a wavy pattern as illustrated in FIG. 4.

Figure 8:
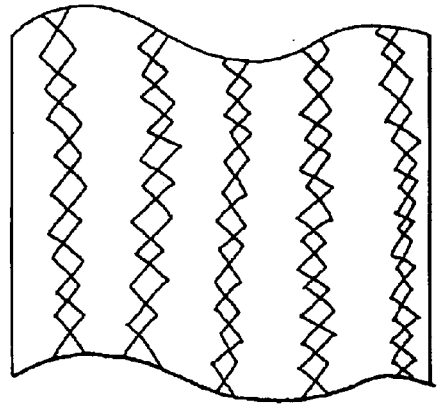
FIG. 8 is a plan view of an entanglement pattern resulting from practice of an embodiment of the method of the invention.

Referring once again to FIG. 5, this embodiment of the method of the invention comprises an additional manifold 230, which may be considered to be substantially identical to manifold 228. As manifold 228 is oscillated, manifold 230 is oscillated in a substantially opposite direction, thereby creating a wavy entanglement on a different phase than that created by manifold 228. The result is a generally "figure 8" shaped entanglement pattern shown in FIG. 5. Bundling occurs along the figure 8 shaped pattern, with less bundling in the in between regions. The result is a laminate nonwoven having a higher wet strength than fabrics made under the methods described herein with reference to FIGS. 1 and 4.

Figure 6:
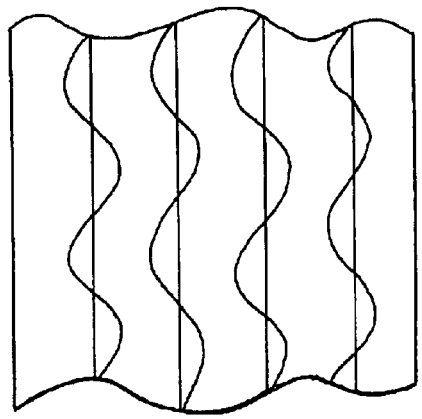
FIG. 6 is a plan view of an entanglement pattern resulting from practice of an embodiment of the method of the invention.
Figure 7:
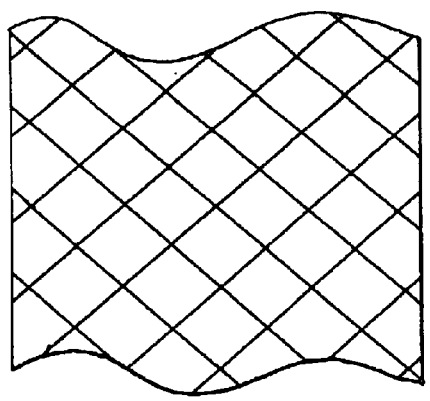
FIG. 7 is a plan view of an entanglement pattern resulting from practice of an embodiment of the method of the invention.

In addition to the dual oscillating manifold method as described with reference to FIG. 5, it will be appreciated that a number of other modes of operation will be possible with two or more manifolds. For example, the amplitude of oscillations for a moving manifold can be changed to affect the entanglement pattern. As an additional example, the entanglement pattern of FIG. 6 can be created by oscillating one manifold while holding a second manifold stationary. The "diamond" shaped entanglement pattern of FIG. 7 can be created by advancing dual manifolds in opposite directions across the cross direction of the layers without oscillation. That is, each manifold is directed substantially across the underlying layers simultaneously in opposite directions. The sharp diamond shaped entanglement pattern of FIG. 8 may be created by oscillating two manifolds in "sharp" oscillations as opposed to "softer", wavy oscillations. Likewise, of course, a single manifold could be sharply oscillated to create a "lightning bolt" entanglement pattern. Manifolds in addition to two may of course also be comprised within the method of the invention as claimed to result in other entanglement patterns.

It is noted that as used herein, the terms "zig-zagged", "criss crossed", and "figure eight" are intended to refer to a condition of generally repeating patterns of line crossings. The terms are not intended to refer to any particular angle measurement ranges or of angle acuteness.

It will be appreciated that the various embodiments of the method of the present invention thereby allow for the precise design of laminate fabrics of a desired wet strength. A multitude of variables may of course be changed within the method of the invention to alter the ultimately produced fabric's wet strength. By way of example, the distance D2 between jet clusters 32 of FIG. 3 can be changed to change the degree of fabric entanglement, as well as the size of clusters 32 and the number of individual jet orifices 34. Although the method of the invention has been discovered to have particular utility in creating a laminate nonwoven having a desirable wet strength so as to be useful for wipe applications and yet be flushable, those knowledgeable in the art will readily understand that the method may likewise be used to create fabrics having desirable characteristics for a multitude of other applications.

The advantages of the disclosed invention are thus attained in an economical, practical, energy efficient, and facile manner. While preferred embodiments and example configurations have been shown and described, it is to be understood that various further modifications and additional configurations will be apparent to those skilled in the art. By way of example, the present invention may of course be practiced with any number of nonwoven layers as may be practical. It is intended that the specific embodiments and configurations herein disclosed are illustrative of the preferred and best modes for practicing the invention, and should not be interpreted as limitations on the scope of the invention as defined by the appended claims. As an example, it will be obvious to those knowledgeable in the art that the specific order of number of method steps as disclosed herein could be altered somewhat without change to the underlying spirit and scope of the invention.

What is claimed is:

1. A method for making a degradable laminate nonwoven fabric having regions of dissimilar bundling, comprising the steps of:
    a) providing a first nonwoven layer on a moving support movable in a machine direction;
    b) providing a second nonwoven layer; said second nonwoven layer overlying said first nonwoven layer on said moving support; and
    c) pattern hydroentangling said first and second nonwoven layers to one another to form a laminate nonwoven fabric; said pattern hydroentangling comprising:
        i) providing a first manifold having a plurality of jet clusters therein; each of said jet clusters having a plurality of individual jet orifices therein, each of said individual jet orifices within each of said jet clusters being separated from one another by a first distance, said jet clusters being spaced aoart from one another transversely of said machine direction by a second distance areater than said first distance;
        ii) conveying said moving support under said first manifold in a direction coincident with said machine direction; whereby streams of water from each of said individual jet orifices will be directed onto said first and second nonwoven layers to thereby laminate them to one another to form said laminate nonwoven fabric havina regions of dissimilar bundling wherein said regions are spaced apart from each other transversely of said machine direction by an amount corresponding to said second distance.

2. A method for making a laminate nonwoven fabric as in claim 1, including a step of moving said first manifold in a direction coincident with said machine direction by oscillating said first manifold in a substantially cross direction.

3. A method as in claim 1, further comprising:
    a) providing at least a second manifold, said at least a second manifold having a plurality of jet orifices therein;
    b) conveying said moving support under said at least a second manifold in a machine direction while moving said first manifold in a direction coincident with said machine direction; whereby streams of water from each of said individual jet orifices from each of said first manifold and said second manifold will be directed onto said first and second nonwoven layers to thereby laminate them to one another.

4. A method for making a nonwoven laminate fabric as in claim 3, further comprising the step of moving said at least a second manifold while conveying said moving support thereunder.

5. A method as in claim 3, further comprising the step of oscillating said first manifold while simultaneously oscillating said second manifold in an opposite direction, thereby laminating said first and second nonwoven layers in substantially zig-zagged pattern.

6. A method for making a degradable laminate nonwoven fabric with regions of dissimilar bundling, comprising the steps of:
    a) providing a first nonwoven layer on a moving support movable in a machine direction;
    b) providing a second nonwoven layer; said second nonwoven layer overlying said first nonwoven layer on said moving support; and
    c) pattern hydroentangling said first and second nonwoven layers to one another to form a laminate nonwoven fabric; said pattern hydroentangling comprising:
        i) providing a first manifold having a plurality of jet clusters therein separated from each other transversely of said machine direction by a first distance; each of said jet clusters having a plurality of individual jet orifices therein; each of said individual jet orifices within each of said jet clusters separated from one another by a second distance that is greater than said first distance wherein said second distance is at least twice said first distance;
        ii) conveying said moving support under said first manifold in said machine direction; whereby streams of water from each of said individual jet orifices will be directed onto said first and second nonwoven layers to thereby laminate them to one another to form said laminate nonwoven fabric having regions of dissimilar bundling wherein said regions are spaced apart from each other transversely of said machine direction by an amount corresponding to said second distance.

7. A method for making a laminate nonwoven fabric as in claim 6, wherein said second distance is at least 10 times said first distance.

8. A method for making a nonwoven laminate fabric as in claim 6, further comprising the step of moving said first manifold in a direction coincident with said machine direction while conveying said moving support thereunder.

9. A method for making a laminate nonwoven fabric as in claim 8, wherein said step of moving said first manifold in a direction coincident with said machine direction comprises oscillating said first manifold in a substantially cross direction.

10. A method for making a nonwoven laminate as in claim 6, further comprising the step of moving said first manifold over said moving support in a first direction that is coincident with said machine direction at a first speed; and moving said first manifold back over said moving support in a second direction that is substantially opposite said first direction at a second speed that is different from said first speed.

11. A method for making a laminate nonwoven fabric as in claim 6, further comprising:
    a) providing at least a second manifold, said at least a second manifold having a plurality of jet orifices therein;
    b) conveying said moving support under said at least a second manifold in a machine direction while moving said first manifold in a direction coincident with said machine direction; whereby streams of water from each of said individual jet orifices from each of said first manifold and said second manifold will be directed onto said first and second nonwoven layers to thereby laminate them to one another.

12. A method for making a nonwoven laminate fabric as in claim 11, further comprising the step of moving said at least a second manifold while conveying said moving support thereunder.

13. A method as in claim 11, further comprising the step of oscillating said first manifold while simultaneously oscillating said second manifold in an opposite direction, thereby laminating said first and second nonwoven layers in a substantially zig-zagged pattern.

14. A method as in claim 6, further comprising the steps of:
  a) providing a third nonwoven layer overlying said second nonwoven layer on said moving support; and
  b) conveying said third nonwoven layer under said first manifold with said first and second nonwoven layers whereby said first, second, and third nonwoven layers are pattern hydroentangled to one another to form a laminate nonwoven fabric.

15. A method as in claim 14, wherein said first and third nonwoven layers each have a basis weight of between about 10 gm/m$^2$ and 35 gm/m$^2$, and said second nonwoven layer has a basis weight of between about 20 and 80 gm/m$^2$.

16. A method as in claim 14, wherein said first and third nonwoven layers each have a basis weight of between about 18 gm/m$^2$ and 24 gm/m$^2$, and said second nonwoven layer has a basis weight of between about 40 and 50 gm/m$^2$.

17. A method as in claim 14, wherein said first and third nonwoven layers comprise viscose rayon with a basis weight of between about 18 gm/m$^2$ and 24 gm/m$^2$, and wherein said second nonwoven layer comprises pulp with a basis weight of between about 40 and 50 gm/m$^2$.

18. A method as in claim 14, wherein said first and third nonwoven layers are hydroentangled with a jet energy between about 175 kj/kg and 1500 kj/kg.

19. A method as in claim 14, wherein said first, second, and third nonwoven layers are laminated to one another with an entanglement energy of between about 215 and 2000 kj/kg.

20. A method for making a degradable laminate nonwoven fabric having regions of dissimilar bundling, comprising:

a) hydroentangling a first nonwoven layer, said first nonwoven layer comprised of viscose rayon, said first nonwoven layer hydroentangled with an entanglement energy of between about 175 kj/kg and 1500 kj/kg, placing said first nonwoven layer on a moving support;
  b) hydroentangling a second nonwoven layer, said second nonwoven layer comprising pulp; overlying said second nonwoven layer over said first nonwoven layer on said moving support movable in a machine direction;
  c) hydroentangling a third nonwoven layer, said third nonwoven layer comprised of viscose rayon, said third nonwoven layer entangled with an entanglement energy of between about 175 kj/kg and 1500 kj/kg, placing said third nonwoven layer over said second layer on said moving support; and
  d) pattern hydroentangling said first, second, and third layers to one another to form a laminate nonwoven fabric; said pattern hydroentangling comprising:
    i) providing a first manifold having a plurality of jet groupings therein, each of said jet groupings having a plurality of individual jet orifices, said individual jet orifices within one of said jet groupings separated from one another by at least a first distance; each of said jet groupings being separated from one another by a second distance, said second distance being at least twice said first distance;
    ii) conveying said moving support under said first manifold, directing water through said first manifold individual jet orifices onto said first, second and third nonwoven layers whereby said first, second and third nonwoven layers will be laminated to one another to form said laminate nonwoven fabric having regions of dissimilar bundling wherein said regions are spaced apart from each other transversely of said machine direction by an amount corresponding to said second distance.

* * * * *